United States Patent
Carlino et al.

(10) Patent No.: US 9,279,492 B2
(45) Date of Patent: Mar. 8, 2016

(54) ORIENTATION-FREE PLANETARY PIN FOR LUBRICATION OF PLANETARY BEARINGS

(71) Applicant: Schaeffler Technologies AG & Co. KG, Herzogenaurach (DE)

(72) Inventors: Ryan Carlino, Charlotte, NC (US); Joseph T. Griffin, Matthews, NC (US); Charles Schwab, Fort Mill, SC (US); Alfred Thomas, Mint Hill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/635,445

(22) Filed: Mar. 2, 2015

(65) Prior Publication Data
US 2015/0267804 A1 Sep. 24, 2015

Related U.S. Application Data

(60) Provisional application No. 61/954,858, filed on Mar. 18, 2014.

(51) Int. Cl.
*F16H 48/06* (2006.01)
*F16H 57/04* (2010.01)
*F16H 57/08* (2006.01)

(52) U.S. Cl.
CPC .......... *F16H 57/0482* (2013.01); *F16H 57/043* (2013.01); *F16H 57/0471* (2013.01); *F16H 57/08* (2013.01); *F16H 2057/085* (2013.01)

(58) Field of Classification Search
CPC . F16H 57/0482; F16H 57/0471; F16H 57/08; F16H 57/043; F16H 2057/085
See application file for complete search history.

(56) References Cited

U.S. PATENT DOCUMENTS

| | | | |
|---|---|---|---|
| 2004/0060744 A1* | 4/2004 | Winkelmolen | 177/145 |
| 2005/0209039 A1* | 9/2005 | Kempf | 475/159 |
| 2006/0068961 A1* | 3/2006 | Haka | 475/159 |
| 2007/0199789 A1* | 8/2007 | Nishida et al. | 192/70.12 |
| 2008/0268997 A1* | 10/2008 | Gooden | 475/160 |
| 2010/0144479 A1* | 6/2010 | Nakamura et al. | 475/159 |
| 2010/0222173 A1* | 9/2010 | Diosi et al. | 475/116 |
| 2010/0317477 A1* | 12/2010 | Sheridan et al. | 475/159 |
| 2010/0317478 A1* | 12/2010 | McCune et al. | 475/159 |
| 2011/0009234 A1* | 1/2011 | Heuver | 475/346 |
| 2013/0008274 A1* | 1/2013 | Mori et al. | 74/421 A |
| 2013/0305878 A1* | 11/2013 | Seno et al. | 74/665 A |
| 2014/0087908 A1* | 3/2014 | Smetana et al. | 475/159 |

* cited by examiner

*Primary Examiner* — David J Hlavka
(74) *Attorney, Agent, or Firm* — Volpe and Koenig, P.C.

(57) ABSTRACT

A planet pin for use in a planetary gear system and a gear system including a planet pin are disclosed. The inventive planet pin provides a plurality of radial passages in fluid communication with an axial passage which can advantageously eliminate, or substantially reduce, the need to orient a planet pin in a planetary gear system.

6 Claims, 4 Drawing Sheets

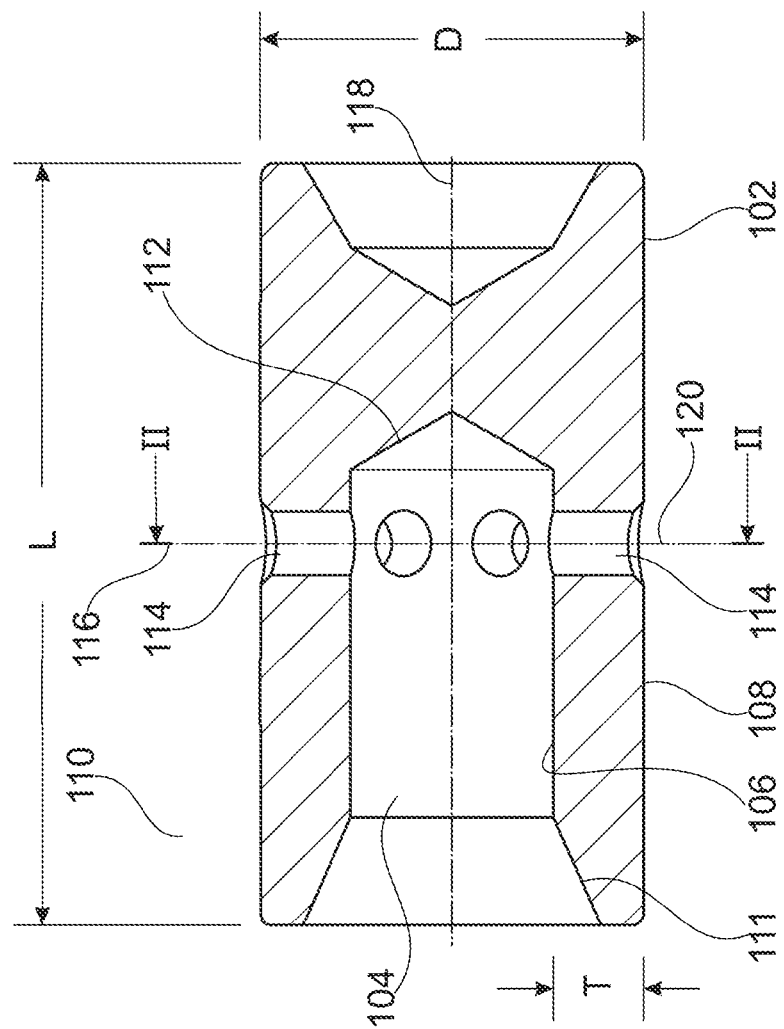
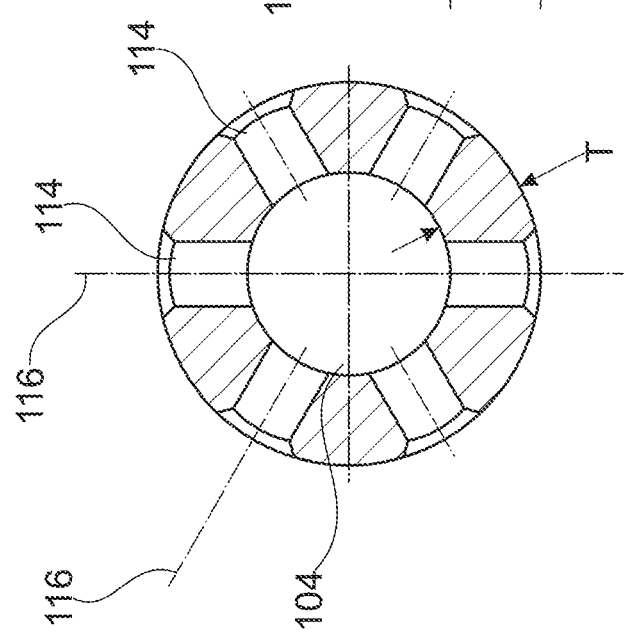

ORIENTATION-FREE PLANETARY PIN FOR LUBRICATION OF PLANETARY BEARINGS

CROSS REFERENCE TO RELATED APPLICATIONS

This application claims the benefit of U.S. Patent Application No. 61/954,858 filed on Mar. 18, 2014 which is incorporated by reference as if fully set forth.

FIELD OF INVENTION

Embodiments of the present invention generally relate to planetary gearsets using planetary bearings in power transmission mechanisms.

BACKGROUND

Some power transmission mechanisms, for example automotive transmissions, employ planetary gearsets that operate at high performance levels, which may include high speed or high centrifugal loading. As such, the planetary bearings require lubrication for reliable operation and thermal stability. In some transmissions, planet pins having an axial hole in fluid communication with radial holes are provided to deliver a lubrication fluid, for example oil, from a source such as an "oil dam" or a "lube catcher" to the planetary bearing during operation.

Current planetary gear systems may include a lubrication system having planet pins, each with an axial hole and one radial hole passing through opposite walls of the pin. These planet pins must be installed oriented rotationally ("clocked") such that the axis of the radial hole corresponds with a position between about 11 o'clock and about 1 o'clock (approximately 0°±30° from vertical) when in the normal operating position in order that oil may pass from the axial hole to the radial hole and into the planetary bearing. Incorrect installation is associated with premature failure of the planetary gear system. An alignment feature, for example a notch, may be provided to aid in proper orientation of the planet pin. However, the assembly process requires careful attention, orientation of the planet pins, and resultant slower assembly speeds to assure proper placement of the planet pins.

Accordingly, a need exists for an improved planet pin for use in a planetary gear system.

SUMMARY

Embodiments of a planet pin for use in a planetary gear system and a gear system including a planet pin are provided. In some embodiments, the planet pin comprises a cylindrical body having an axial passage defined by an inner cylinder wall and a wall thickness between the inner cylinder wall and an outer cylinder wall; and a plurality of radial passages through the wall thickness configured such that axes of radially adjacent radial passages are offset by less than 180° when viewed along an axis of the axial passage, wherein the plurality of radial passages provide a corresponding plurality of fluid paths between the axial passage and the outer wall.

In some embodiments, a planetary gear system comprises a centrally located sun gear having outwardly directed gear teeth; a ring gear concentric with, and circumscribed about, the sun gear, the ring gear having inwardly directed gear teeth; and a planet gear disposed between an inner diameter of the ring gear and an outer diameter of the sun gear, the planet gear having outwardly directed gear teeth configured to concurrently engage the outwardly directed gear teeth of the sun gear and the inwardly directed gear teeth of the ring gear, wherein the planet gear is supported for rotation on a plurality of rotating member disposed in a raceway about a planet pin comprising a cylindrical body having an axial passage defined by an inner cylinder wall and a wall thickness between the inner cylinder wall and an outer cylinder wall; and a plurality of radial passages through the wall thickness configured such that axes of radially adjacent radial passages are offset by less than 180° when viewed along an axis of the axial passage, wherein the plurality of radial passages provide a corresponding plurality of fluid paths between the axial passage and the outer wall.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

FIG. 1 depicts a side sectional view of a planet pin in accordance with an embodiment of the present invention.

FIG. 2 depicts an axial view of the planet pin of FIG. 1 taken along line II-II.

Figure 3:
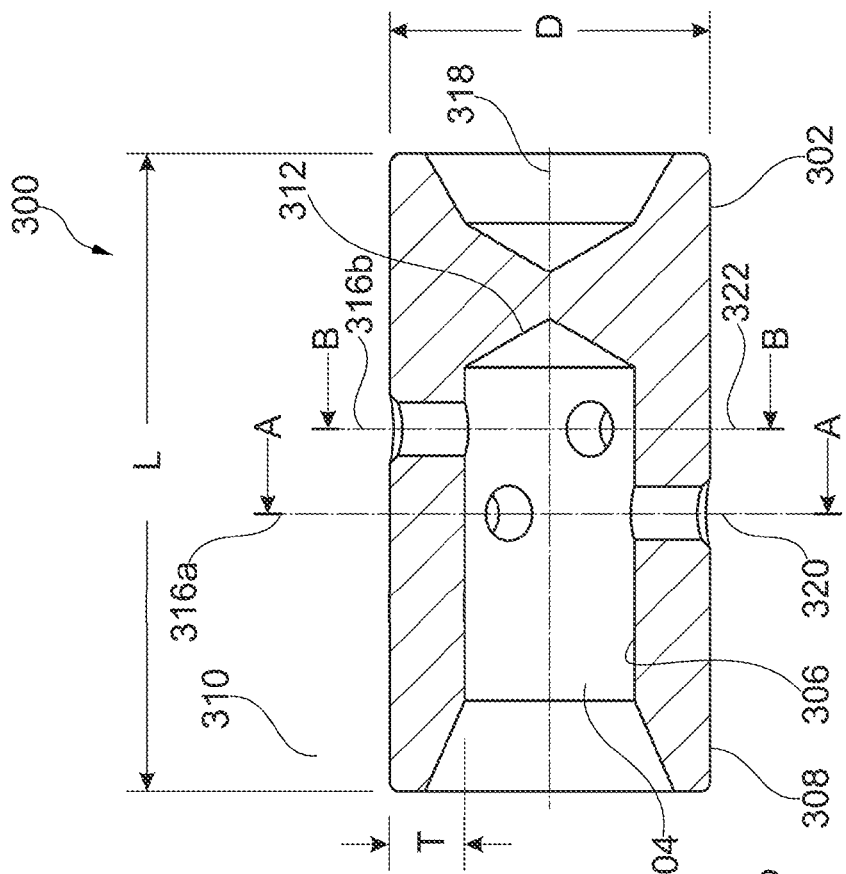
FIG. 3 depicts a side sectional view of a planet pin in accordance with an embodiment of the present invention.

To facilitate understanding, identical reference numerals have been used, where possible, to designate identical elements that are common in the figures. The figures are not drawn to scale and may be simplified for clarity. It is contemplated that elements and features of one embodiment may be beneficially incorporated in other embodiments without further recitation.

While described in reference to automotive transmissions, the present invention may be modified for a variety of applications while remaining within the spirit and scope of the claimed invention, since the range of the potential applications is great, and because it is intended that the present invention be adaptable to many such variations.

DETAILED DESCRIPTION OF THE PREFERRED EMBODIMENTS

FIG. 1 depicts a side sectional view of a planet pin, pin 100, in accordance with an embodiment of the present invention. The pin 100 has a generally cylindrical body 102, with an axial passage 104 formed at least partially through the length L of the body 102. The axial passage is defined by an inner cylinder wall 106 which, together with the outer cylinder wall 108, establishes a wall thickness T.

The first end 110 of the inner cylinder wall 106 may be formed with an optional radially outward taper, flare 111, as illustrated. Other embodiments may have a more or less dramatic flare, a step, or no flare or step at all, in which case the inner cylinder wall 104 maintains a constant diameter along its length. As illustrated, the inner cylinder wall 104 may terminate within the body 102 at a conical second end 112, although second ends with other shapes, such as a flat bottom, may be used with similar benefits.

As illustrated in FIGS. 1 and 2, a plurality of radial passages 114 is formed through the wall thickness T. For ease of illustration, the radial passages 114 are shown with an axis 116 perpendicular to the longitudinal axis 118 of the body 102, although other orientations may be used with similar results. Six radial passages 114 are illustrated in FIG. 2, approximately equally spaced around a first circumference 120 of the body 102. The inventors have found that with six radial passages 114 radially spaced evenly apart at about 60° intervals any rotational orientation of the pin 100 beneficially provides at least one radial passage positioned between the approximate 11 o'clock and 1 o'clock positions with respect to a planet gear (to be discussed below) to facilitate the flow of oil from the axial passage 104 to the radial passages 114 and into the planetary bearing. In some applications, it may be suitable to orient radial passages 114 at a position other than between the approximate 11 o'clock and 1 o'clock positions. In such cases, the radial passages 114 may be radially spaced apart at intervals greater than about 60°. In other cases, it may be beneficial to provide more than one radial passage 114 between the 11 o'clock and 1 o'clock positions. Therefore, the radial passages 114 may be radially spaced apart at intervals less than 60°.

FIG. 3 depicts a side sectional view of a planet pin 300, in accordance with a further embodiment of the present invention. Similar to the pin 100, the pin 300 has a generally cylindrical body 302, with an axial passage 304 formed at least partially through the length L of the body 302 and a wall thickness T defined by the inner cylinder wall 306 and the outer cylinder wall 308.

The first end 310 of the inner cylinder wall 306 may include an optional radially outward taper, flare 311, as illustrated, or may have a more or less dramatic flare, a step, or no flare or step at all, in which case the inner cylinder wall 304 maintains a constant diameter along its length. The inner cylinder wall 304 may terminate within the body 302 at a conical second end 312, although second ends with other shapes, such as a flat bottom, may be used with similar benefits.

A plurality of radial passages 314 is formed through the wall thickness T of body 302. For ease of illustration, the radial passages 314 are shown with an axis 316 perpendicular to the longitudinal axis 318 of the body 302. Other orientations of the radial passages 114 may be used with similar results. Six radial passages 314 are illustrated in FIG. 3, with three passages approximately equally spaced around a first circumference 320 of the body 302 and three passages approximately equally spaced around a second circumference 322 of the body 302.

As above with the embodiment discussed above, the inventors have found it beneficial to provide radial passages 314 radially spaced evenly apart at approximately 60° intervals so that at least one radial passage positioned between the approximate 11 o'clock and 1 o'clock positions with respect to a planet gear (to be discussed below) to facilitate the flow of oil from the axial passage 304 to the radial passages 314 and into the planetary bearing. However, in some applications, it may not be desirable to place six, or more, radial passages 314 along the same circumference (e.g., 120. For example, in some cases the combination of planet pin length L, diameter D, and the number and geometry of the radial passages 314 may affect certain characteristics of the pin 300 such a resistance to bending. In such cases, it may be beneficial to place a first set comprising some of the plurality radial passage 314 on a first circumference 320 and a second set comprising other of the plurality of radial passages 314 on a second circumference 322. In some embodiments, each of the plurality of radial passages 314 formed through the wall thickness T of the body 302 is in one of the first set or the second set. In other embodiments, the total number of radial passages 314 may consist of the first set, the second set, and additional radial passages not lying along the first or second circumferences 320, 322, and therefore not included in either the first or second sets.

In other cases, it may be beneficial to provide radial passages along the length of the pin in certain planetary gear systems having long pinion gears (i.e., compound or Ravigneaux) with multiple bearing rows. It may be advantageous to provide planet pins in such systems with multiple rows of radial passages, for example to provide a lubricant, for example oil, to each row or bearings.

Figures 4A, 4B:
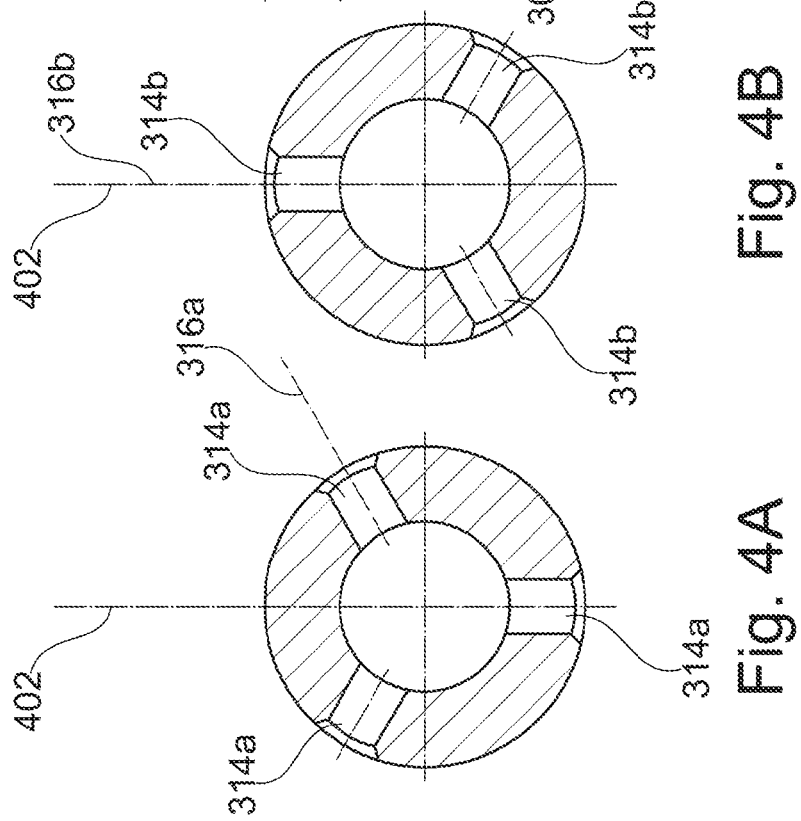
FIG. 4A depicts an axial view of the planet pin of FIG. 3 taken along line A-A.
FIG. 4B depicts an axial view of the planet pin of FIG. 3 taken along line B-B.

As illustrated in FIGS. 3, 4A and 4B, the pin 300 comprises a first set of radial passages 314*a* (FIG. 4A) positioned along a first circumference 320 and a second set of radial passages 314*b* (FIG. 4B) along a second circumference 322. Collectively, 314*a* and 314*b* may be referred to as radial passages 314.

First and second circumferences 320, 322 are spaced apart along axis 318 such that each of the first set of radial passages 314*a* and each of the second set of radial passages 314*b* pass through the wall thickness T of body 302 and are in fluid communication with the axial passage 314.

As may be seen in FIG. 3, the radial passages 314 are in a staggered configuration such that a first axial passage 314*a* lies on the first circumference and a radially adjacent second axial passage 314*b* lies on the second circumference. As used herein, "radially adjacent" describes two axial passages 314 having axes that are adjacent (consecutive in angular measure) when viewed along the longitudinal axis 318. For example, in FIG. 4B, a radial passage 314*b* has an axis 316*b* aligned with the vertical axis 402 at 0°. The other radial passages 314*b* are positioned at about 120° and about 240° offset from the vertical axis 402. In FIG. 4A, axis 316*a* of a radial passage 314*a* forms an angle of about 60° with the vertical axis 402. The other radial passages 314*a* are positioned at about 180° and about 300° from vertical axis 402. Radial passage 314*b* aligned at 0° and radial passage 314*a* aligned at 60° are radially adjacent because they are consecutive in angular position when viewed along axis 318.

As illustrated in FIGS. 3, 4A, and 4B, the axes 316*a*, 316*b* of radially adjacent radial passages form an angle of about 60°, thus providing the benefit of at least one radial passage positioned within the 11 o'clock to 1 o'clock positions. As will be understood by one of ordinary skill in the art, the angle between radially adjacent radial passages arranged on different circumferences may be less than about 60° which may provide additional benefits.

The radial passages 314 may also be formed on more than two circumferences spaced along the longitudinal axis. Such a construction may provide additional benefits, for example providing additional lubricant passages or providing lubricant passages to planetary gear systems having long pinion gears as discussed above.

Figure 5A:
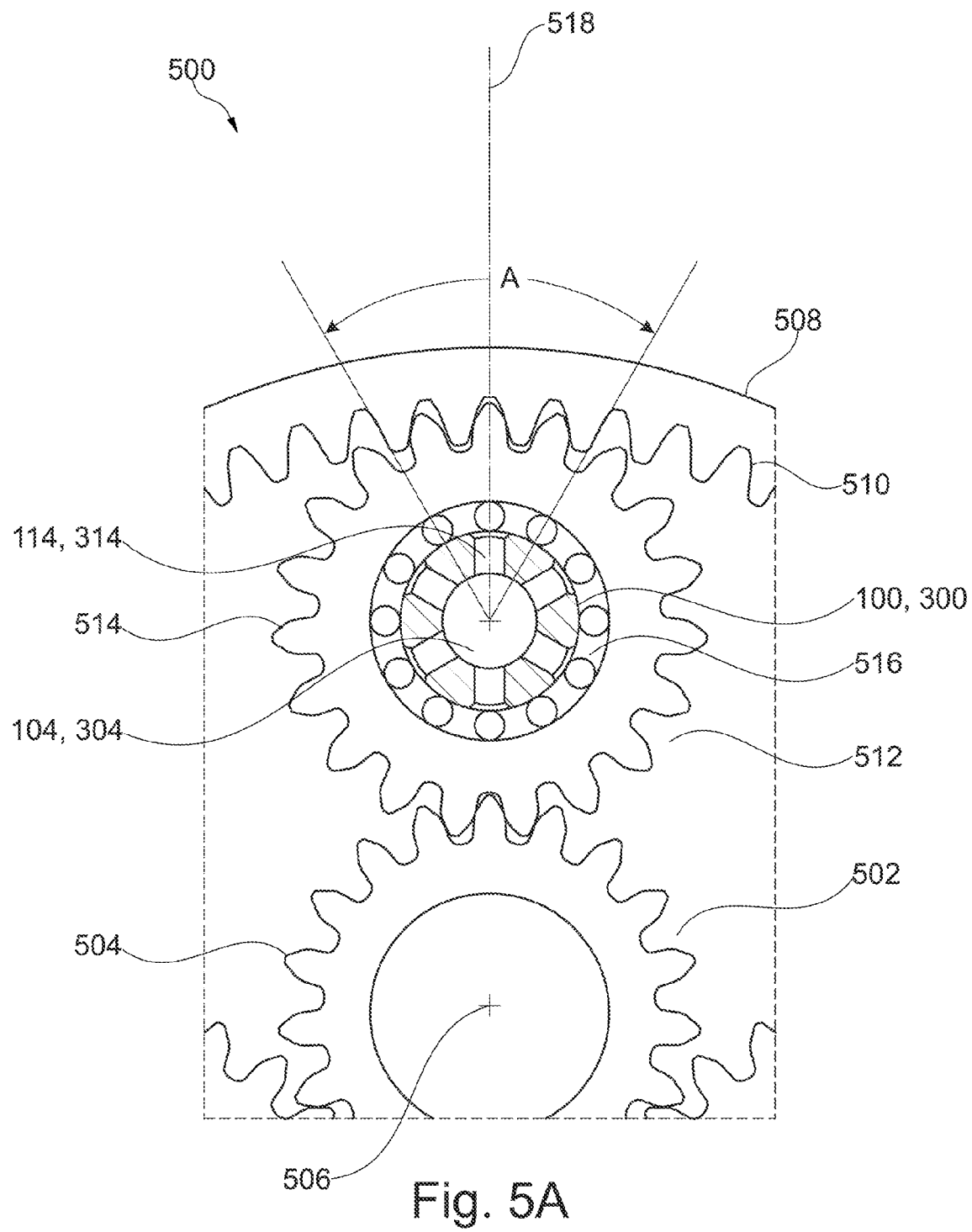
FIGS. 5A and 5B depict axial views of a planetary gear system in accordance with embodiments of the present invention.
Figure 5B:
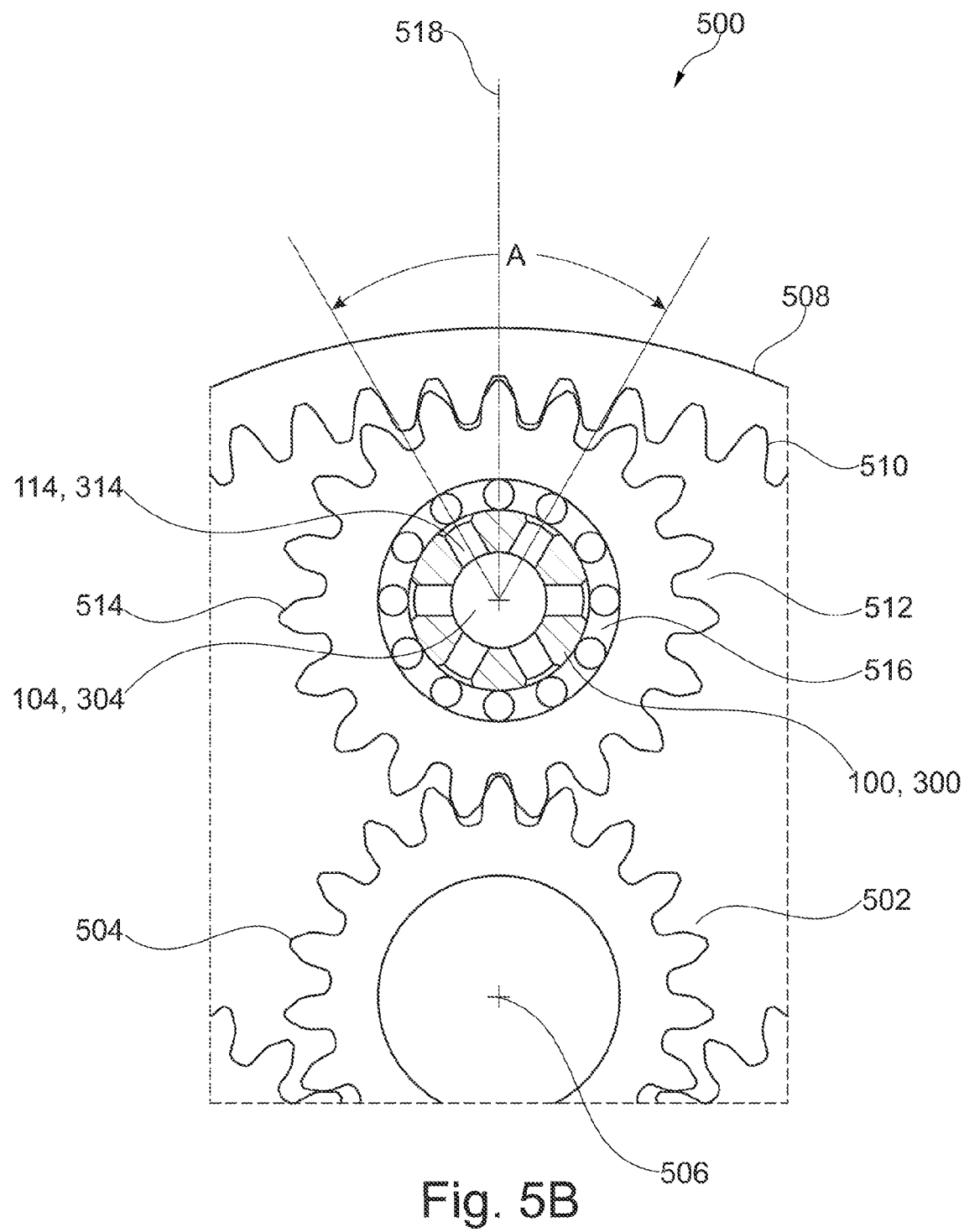

FIGS. 5A and 5B depict a portion of an exemplary planetary gear system 500 comprising a centrally located sun gear 502 with outwardly directed gear teeth 504 and supported for driven rotation about a central axis 506. A ring gear 508 having inwardly directed gear teeth 510 is mounted concentrically with the sun gear 502 and supported for rotation about the central axis 506. A planet gear 512 having outwardly directed gear teeth 514 is disposed between the inner diameter of the ring gear 508 and the outer diameter of the sun gear 502 such that the outwardly directed gear teeth 514 concurrently engage the outwardly directed gear teeth 504 of the sun gear 502 and the inwardly directed gear teeth 510 of the ring gear 508. The planet gear is supported for rotation about the pin 100, 300, which is fixed against rotation. Between the pin 100, 300 and the planet gear 512 is a plurality of rotating members facilitating rotation, illustrated as a planetary bearing 516.

In FIG. 5A, the pin 100, 300 is positioned such that one of the plurality of radial passages 114, 314 is aligned with the vertical axis 518 placing the axial passage 104, 304 in fluid communication with planetary bearing 516. It should be recognized the six axial passages 114, 314 in the pin 100, 300 are generally radially spaced apart by about 60°. Accordingly, rotating the pin 100, 300 less than about 30° would result in the radial passage 114, 314 remaining in the desired region of 11 o'clock to 1 o'clock (corresponding to a range of ±30° shown as angle A).

In FIG. 5B, the pin 100, 300 is rotated from the position of FIG. 5A by about 30°. In this position, about half of two radially adjacent radial passages are within the ±30° of angle A. Further rotation in either direction would result in a decrease of one radial passage being within the angle A and an equivalent increase in the other radial passage being within the angle A. Thus, at a rotation of 30°, the equivalent of one radial passage 114, 314 is within the desired range of angle A.

Accordingly, regardless of the rotational position of the pin 100, 300, one radial passage 114, 314 is advantageously within the region bounded by angle A of 60° which corresponds to the aforementioned desirability of maintaining one axial passage 114, 314 between the 11 o'clock to 1 o'clock positions.

Thus a planet pin for use in a planetary gear system and a gear system including a planet pin are provided herein. The inventive planet pin advantageously eliminates, or substantially reduces, the need to orient a planet pin in a planetary gear system. Accordingly, the assembly process may be advantageously impacted by eliminating, or substantially reducing, the attention required for careful attention to orientation of the planet pins, thereby improving assembly speeds without negatively impacting the final assembly.

What is claimed is:

1. A planetary pin for use in a planetary gear system, the planetary pin comprising:
a cylindrical body having an axial passage defined by an inner cylinder wall and a wall thickness between the inner cylinder wall and an outer cylinder wall; and
a plurality of radial passages through the wall thickness configured such that axes of radially adjacent ones of the radial passages are offset by less than 180° when viewed along an axis of the axial passage,
wherein the plurality of radial passages provide a corresponding plurality of fluid paths between the axial passage and the outer wall,
wherein a first set of the plurality of radial passages lie in a first circumferential plane of the cylindrical body and a second set of the plurality of radial passages lie in a second circumferential plane of the cylindrical body, the first circumferential plane is axially offset from the second circumferential plane of the cylindrical body, and an axis of each radial passage of the first set of the plurality of radial passages is circumferentially offset from an axis of a radially adjacent radial passage of the second set of the plurality of radial passages.

2. The planetary pin of claim 1, wherein the axes of at least some of the plurality of radial passages are perpendicular to the axis of the axial passage.

3. The planetary pin of claim 1, wherein each of the plurality of radial passages is in one of the first set or the second set.

4. The planetary pin of claim 1, wherein an axis of radially adjacent ones of the radial passages are circumferentially offset by 60°.

5. A planetary gear system comprising:
a centrally located sun gear having outwardly directed gear teeth;
a ring gear concentric with, and circumscribed about, the sun gear, the ring gear having inwardly directed gear teeth; and
a planet gear disposed between an inner diameter of the ring gear and an outer diameter of the sun gear, the planet gear having outwardly directed gear teeth configured to concurrently engage the outwardly directed gear teeth of the sun gear and the inwardly directed gear teeth of the ring gear,
wherein the planet gear is supported for rotation about a planet pin on a planetary bearing, the planet pin fixed against rotation, the planet pin comprising:
a cylindrical body having an axial passage defined by an inner cylinder wall and a wall thickness between the inner cylinder wall and an outer cylinder wall; and
a plurality of radial passages through the wall thickness configured such that axes of radially adjacent ones of the radial passages are circumferentially offset by less than 180° when viewed along an axis of the axial passage,
wherein the plurality of radial passages provide a corresponding plurality of fluid paths between the axial passage and the outer wall,
wherein a first set of the plurality of radial passages lie in a first circumferential plane of the cylindrical body and a second set of the plurality of radial passages lie in a second circumferential plane of the cylindrical body, and the first circumferential plane is axially offset from the second circumferential plane of the cylindrical body, and an axis of each radial passage of the first set of the plurality of radial passages is circumferentially offset from an axis of a radially adjacent radial passage of the second set of the plurality of radial passages.

6. The planetary gear system of claim 5, wherein an orientation of the plurality of radial passages is such that the axial passage is in fluid communication with the planetary bearing through one of the plurality of radial passages regardless of a rotational position of the planet pin.

* * * * *